United States Patent
Lin

(10) Patent No.: US 9,591,256 B2
(45) Date of Patent: Mar. 7, 2017

(54) METHODS AND DEVICES FOR VIDEO COMMUNICATION

(71) Applicant: Beijing Xiaomi Technology Co., Ltd., Beijing (CN)

(72) Inventor: Xingsheng Lin, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/577,658

(22) Filed: Dec. 19, 2014

(65) Prior Publication Data

US 2015/0103138 A1   Apr. 16, 2015

Related U.S. Application Data

(63) Continuation-in-part of application No. PCT/CN2013/086648, filed on Nov. 6, 2013.

(30) Foreign Application Priority Data

Dec. 6, 2012  (CN) .......................... 2012 1 0521772

(51) Int. Cl.
| | | |
|---|---|---|
| *H04N 7/01* | (2006.01) | |
| *H04N 7/14* | (2006.01) | |
| *H04L 29/06* | (2006.01) | |
| *H04N 21/2343* | (2011.01) | |
| *H04N 21/258* | (2011.01) | |

(52) U.S. Cl.
CPC ........... *H04N 7/0117* (2013.01); *H04L 65/00* (2013.01); *H04N 7/147* (2013.01); *H04N 21/234363* (2013.01); *H04N 21/25825* (2013.01); *H04N 21/25833* (2013.01)

(58) Field of Classification Search
None
See application file for complete search history.

(56) References Cited

U.S. PATENT DOCUMENTS

| 8,760,489 B1 * | 6/2014 | Osher ................... H04N 7/148 348/14.01 |
| 2003/0222973 A1 * | 12/2003 | Hiroi ..................... H04N 7/148 348/14.01 |
| 2006/0244839 A1 | 11/2006 | Glatron et al. |

(Continued)

FOREIGN PATENT DOCUMENTS

| CN | 101217643 A | 7/2008 |
| CN | 101697579 A | 4/2010 |

(Continued)

OTHER PUBLICATIONS

International Search Report to PCT/CN2013/086648, dated Feb. 20, 2014 (19p).

(Continued)

*Primary Examiner* — Fan Tsang
*Assistant Examiner* — Jeffrey Lytle
(74) *Attorney, Agent, or Firm* — Brinks, Gilson & Lione

(57) ABSTRACT

The present disclosure relates to methods and devices for video communication. The methods include: configuration information of an objective terminal in video communication is obtained; a corresponding camera resolution is selected as a resolution for sampling video according to the configuration information; a video is sampled according to the resolution for sampling video; and the sampled video is sent to the objective terminal.

15 Claims, 6 Drawing Sheets

(56) References Cited

U.S. PATENT DOCUMENTS

| | | | |
|---|---|---|---|
| 2008/0117283 A1 | 5/2008 | Yang et al. | |
| 2009/0049491 A1 | 2/2009 | Karonen et al. | |
| 2009/0231415 A1* | 9/2009 | Moore | H04N 7/152 348/14.09 |
| 2009/0249405 A1 | 10/2009 | Karaoguz et al. | |
| 2011/0279640 A1* | 11/2011 | Choi | H04N 7/148 348/14.12 |
| 2011/0310216 A1* | 12/2011 | Lee | H04N 7/15 348/14.08 |
| 2012/0281062 A1* | 11/2012 | Gu | H04N 21/440263 348/14.12 |
| 2015/0222762 A1* | 8/2015 | Jia | H04N 5/23206 348/207.1 |

FOREIGN PATENT DOCUMENTS

| | | |
|---|---|---|
| CN | 102137248 A | 7/2011 |
| CN | 102984494 A | 3/2013 |
| JP | 8-46928 | 2/1996 |
| JP | 2001-197298 | 7/2001 |
| JP | 2003-348556 | 12/2003 |
| JP | 2005-39515 | 2/2005 |
| JP | 2005-123804 | 5/2005 |
| JP | 2009-17211 | 1/2009 |
| JP | 2010-171690 | 8/2010 |
| JP | 2012-522415 | 9/2012 |
| KR | 10-2006-0009498 | 2/2006 |
| WO | WO2012078027 A1 | 6/2012 |

OTHER PUBLICATIONS

Supplemental European Search Report issued Oct. 12, 2015 in European Patent Application No. 13860641.3.

Office Action issued Jul. 28, 2015 in corresponding Russian Application No. 2014152328, with English translation.

Office Action dated Aug. 4, 2016 for Korean Application No. 10-2014-7035292, 6 pages.

* cited by examiner

METHODS AND DEVICES FOR VIDEO COMMUNICATION

CROSS-REFERENCE TO RELATED APPLICATIONS

This application is a Continuation-in-part application of International Application No. PCT/CN2013/086648, filed on Nov. 6, 2013, which is based upon and claims priority to Chinese Patent Application No. CN201210521772.0, filed on Dec. 6, 2012, the entire contents of which are incorporated herein by reference.

TECHNICAL FIELD

The present disclosure generally relates to a technical field of multimedia communication, and more particular, to the technical field of video communication technique. Specially, the present disclosure relates to methods and devices for video communication.

BACKGROUND

With the development of internet technologies and multimedia technologies, mobile terminals (e.g., smart phones, tablet computers etc.) have more and more plentiful functions, and increasingly powerful abilities of data processing and transmission. Nowadays, some of the mobile terminals have already had functions of video communications, and various video communication applications have been developed accordingly. Today's users have stronger preference to mobile terminal with advanced video communication functions.

In real life, the mobile terminals used by users are not always the same. That is, users may use different mobile terminals with different brands and types. Different mobile terminals may have different screen resolutions and different resolutions of camera-sampled image.

When two users use mobile terminals with different length-to-width ratio (i.e., aspect ratio) in their respective screen during a video communication, the mobile terminals may have to stretch, compress and/or crop the received video communication content to a different length-to-width ratio in order to display the video communication content full screen. The out-of-ratio stretching, compressing and/or cropping inevitably causes distortion to the image of the video communication.

SUMMARY

According to a first aspect of the present disclosure, there is provided a video communication method, which includes: configuration information of an object terminal in video communication is obtained; a corresponding camera resolution is selected as a resolution for sampling video according to the configuration information; a video is sampled according to the resolution for sampling video and the sampled video is sent to the object terminal.

According to a second aspect of the present disclosure, there is provided a device for video communication including: a processor; and a memory for storing instructions executable by the processor. The processor is configured to perform: obtaining configuration information of an object terminal in video communication; selecting a corresponding camera resolution as a resolution for sampling video according to the configuration information; sampling a video according to the resolution for sampling video; and sending the sampled video to the object terminal.

According to a third aspect of the present disclosure, there is provided a non-transitory computer-readable storage medium having stored therein instructions that, when executed by a processor of a mobile terminal, causes the mobile terminal to perform a video communication method, the method including: obtaining configuration information of an object terminal in video communication; selecting a corresponding camera resolution as a resolution for sampling video according to the configuration information; sampling a video according to the resolution for sampling video; and sending the sampled video to the object terminal.

It should be understood that, above general description and the detailed description thereafter is only illustrative, and should not be considered as limitation to the present disclosure.

BRIEF DESCRIPTION OF THE DRAWINGS

The drawings intend to provide further comprehension of the present disclosure, and to form a part of the present application, and do not limit the present application. In the drawings.

The example embodiments of the present disclosure, which will be described in detail, have been illustrated by reference to those drawings. These drawings and literal description is not for the purpose of limiting the scope of conception of the present disclosure in any manner, but for the purpose of illustrating the concept of the present disclosure for those skilled in the art, by means of specific embodiments.

DETAILED DESCRIPTION

In order to make the objects, technical solutions and advantages of the present disclosure clearer, detailed description will be made to the present disclosure through the embodiments and figures. Here, the illustrative embodiments and the illustration thereof of the present disclosure are used for explanation of the present disclosure, and should not be considered as limitation to the present disclosure.

The embodiment of the present disclosure provides methods and devices for video communication. Hereinafter, the present disclosure will be illustrated in detail in combination with the drawings.

Figure 7:
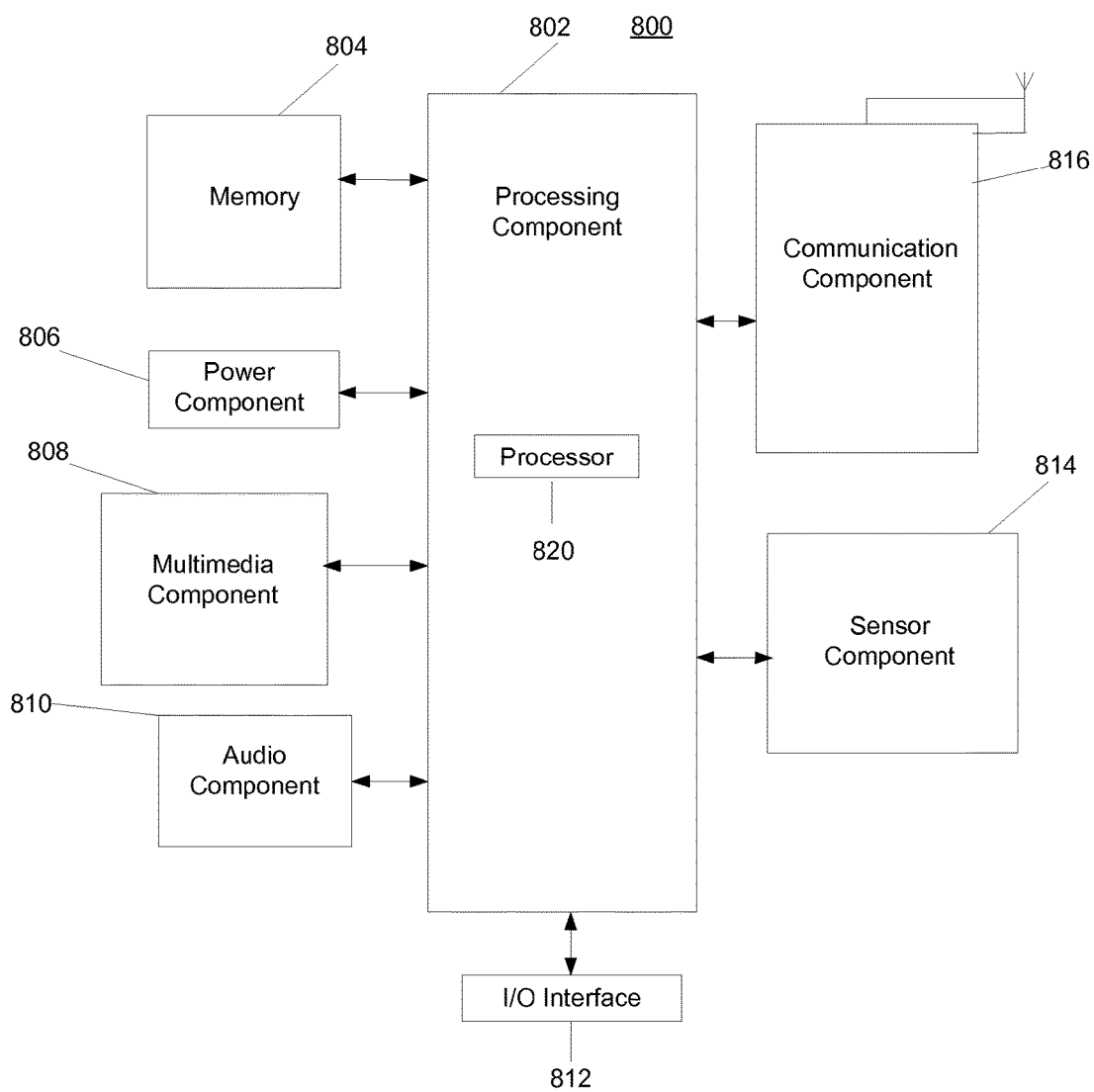
FIG. 7 is a block diagram of a device according to the example embodiments of the present disclosure.

FIG. 7 is a block diagram of a device 800 for video communication according to example embodiments of the present disclosure. For example, the device 800 may be a mobile phone, a computer, a digital broadcast terminal, a messaging device, a gaming console, a tablet, a medical device, exercise equipment, a personal digital assistant, and the like.

The device 800 may include one or more of the following components: a processing component 802, a memory 804, a power component 806, a multimedia component 808, an audio component 810, an input/output (I/O) interface 812, a sensor component 814, and a communication component 816.

The processing component 802 may control overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may be configured to store various types of data to support the operation of the device 800. Examples of such data may include instructions for any applications or methods, including the methods in the present disclosure, that are operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 may provide power to various components of the device 800. The power component 806 may include a power management system, one or more power sources, and any other components associated with the generation, management, and distribution of power in the device 800.

The multimedia component 808 may include a screen providing an output interface between the device 800 and the user. In some embodiments, the screen may include a liquid crystal display (LCD) and a touch panel (TP). When the screen includes the touch panel, the screen may be implemented as a touch screen to receive input signals from the user. The touch screen may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 may include a front camera and/or a rear camera. The front camera and the rear camera may receive external multimedia data while the device 800 is in an operation mode, such as a photographing mode or a video mode. Each of the front camera and the rear camera may be a fixed optical lens system or have focus and optical zooming capability.

The audio component 810 may be configured to output and/or input audio signals. For example, the audio component 810 may include a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 may provide an interface between the processing component 802 and peripheral interface modules, such as a keyboard, a click wheel, buttons, and the like. The buttons may include, but are not limited to, a home button, a volume button, a starting button, and a locking button.

The sensor component 814 may include one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 may be able to access a wireless network based on a communication standard, such as WiFi, 2G, or 3G, or a combination thereof. In one example embodiment, the communication component 816 may receive a broadcast signal or broadcast associated information from an external broadcast management system via a broadcast channel. In one example embodiment, the communication component 816 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer-readable storage medium, such as the memory 804, including and/or storing one or more sets of instructions executable by the processor 820 in the device 800, for performing the below-described methods. For example, the non-transitory computer-readable storage medium may be a ROM, a RAM, a CD-ROM, a magnetic tape, a floppy disc, an optical data storage device, and the like. When the processor 820 executes the one or more sets of instructions, the processor 820 may perform acts and/or functions of the methods in the present disclosure.

Merely for illustration, only one processor 820 is described in the device 800 that execute operations and/or method steps in the following example embodiments. However, it should be note that the device 800 in the present disclosure may also include multiple processors, thus operations and/or method steps that are performed by one processor as described in the present disclosure may also be jointly or separately performed by the multiple processors. For example, if in the present disclosure a processor of a device 800 executes both step A and step B, it should be understood that step A and step B may also be performed by two different processors jointly or separately in the device 800 or more than one device 800 (e.g., the first processor executes step A and the second processor executes step B, or the first and second processors jointly execute steps A and B).

Figure 1:
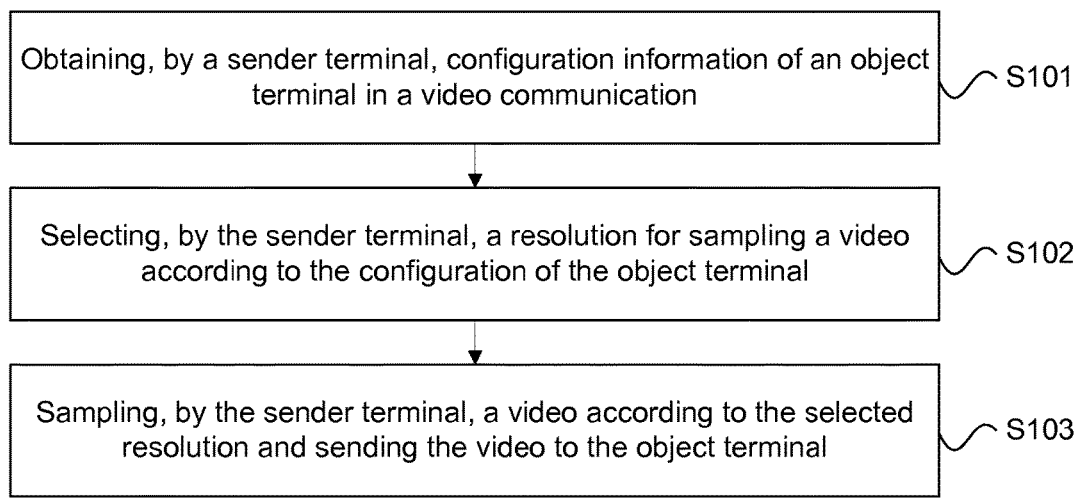
FIG. 1 is an example flowchart showing a video communication method according to example embodiments of the present disclosure.

FIG. 1 is an example flowchart of a video communication method according to an example embodiment of the present disclosure. The method may be stored in a non-transitory storage medium in the memory 804 as a set of instruction, and may be implemented and executed by the processor 820 of the device 800. The method may include the following steps.

At step S101, obtaining, by a sender terminal, configuration information of an object terminal in a video communication.

According to the example embodiments of the present disclosure, when a first user using a mobile terminal A (e.g., a sender terminal, such as the device 800) wishes to make video communication with a second user using a mobile terminal B (e.g., the object terminal or receiver terminal), the sender terminal may first obtain configuration information of the object terminal before starting the video communication. When the video communication is bilateral, the mobile terminal A and the mobile terminal B may first obtain configuration information of each other before starting the video communication between the mobile terminal A and the mobile terminal B. The configuration information may include, but is not limited to, display resolution information of the object terminal and data processing ability information of the object terminal. The display resolution information of the object terminal may include a screen resolution of the object terminal and a resolution of a video conversation window of the object terminal, and the data processing ability information of the object terminal may include the frequency of the CPU, the size of memory, and the model of the graphic processing chip of the object terminal.

At step S102, selecting, by the sender terminal, a resolution for sampling a video according to the configuration of the object terminal.

In the embodiment of the present disclosure, the sender terminal A may select a camera resolution for sampling a video from its local camera according to the configuration information of the object terminal B. further, during a bilateral (i.e., two-way) video communication between mobile terminal A and mobile terminal B, the mobile terminals A and B both serve as sender terminals and are mutually object terminals to each other. Each of the mobile terminal A and the mobile terminal B may select a corresponding camera resolution, from the resolutions supported by a camera thereof, as the resolution for sampling the video according to the configuration information of the object mobile terminal.

According to the example embodiments of the present disclosure, when the configuration information is the display resolution information of the object terminal, the sender terminal may adjust a resolution of its local camera for sampling a video to match with the display resolution of the object terminal. When the local camera of the sender terminal is capable of sampling video contents at a same level as or higher level than the resolution of the object terminal's screen, the sender terminal may adjust the resolution (i.e., sampling resolution) of the local camera to the same or similar level as the display resolution of the object terminal. When the maximum resolution of the local camera of the sender terminal is lower than the display resolution of the object terminal, the local camera may use its maximum resolution that matches the display resolution of the object terminal in sampling the video content. Further, when the local camera does not support the display aspect ratio of the object terminal (e.g., the number of pixels in horizontal direction vs. the number of pixels in vertical direction), the sender terminal may search resolution options supported by its local camera, and select a resolution with the same aspect ratio of the object terminal and adjust its local camera to the selected aspect ratio for sampling. If no resolution options of the local camera has the same aspect ratio as the object terminal, the sender terminal may search resolution options supported by its local camera and select therefrom a resolution aspect ratio that has a minimum difference from the object terminal as the resolution for sampling video, and crop the sampled video to the aspect ratio of the object terminal.

In the example embodiments of the present disclosure, when the configuration information is the data processing ability information of the object terminal, the sender terminal may obtain the data processing ability of the object terminal and may accordingly select a corresponding camera resolution as the resolution for sampling the video. For example, if the data processing ability of the object terminal is relatively good, the sender terminal may select a relatively high camera resolution as the resolution for sampling the video. If the data processing ability of the object terminal is relatively poor, the sender terminal may select a relatively low camera resolution for sampling the video.

In the embodiment of the present disclosure, the sender terminal may select a camera resolution as the resolution for sampling the video according to both of the display resolution information and the data processing ability information of the object terminal. Firstly, the sender terminal may select a set of appropriate camera resolutions may according to the display resolution information of the object terminal, and then based on the data processing ability of the object terminal, the sender terminal may select a camera resolution may from the set of appropriate camera resolutions as the resolution for sampling the video. Alternatively, in another example embodiment of the present disclosure, the sender terminal may first may select a set of appropriate camera resolutions according to the data processing ability information of the object terminal, and then based the display resolution information of the object terminal the sender terminal may select a camera resolution from the set of appropriate camera resolutions as the resolution for sampling the video.

At step S103, the sender terminal samples the video according to the selected resolution and sends the video to the object terminal.

In the embodiment of the present disclosure, the sender terminal A may sample a video with the selected resolution and send the video to the object terminal B. Further, in a bilateral communication mobile terminal B may also select a resolution for its local camera using the same method set forth above, sample a video from its local camera with a selected resolution, and then send the video to the mobile terminal A at the same time during receiving the video from the mobile terminal A.

According to the video communication method provided by the example embodiments of the present disclosure, the resolution for sampling video by the local camera of the sender terminal may be automatically matched to the configuration of the object terminal. Thus there is no need for the object terminal to perform an out-of-ratio stretching, compressing or cropping process on the received video. Accordingly, the distortion to the length-to-width ratio (i.e., aspect ratio) of the original video content may be prevented, and the user's experience is improved.

The video communication methods provided by the example embodiments of the present disclosure are not limited to the mobile terminals. The method may be applicable to other video terminal devices such as PC, notebook, multimedia TV and so on.

Figure 2:
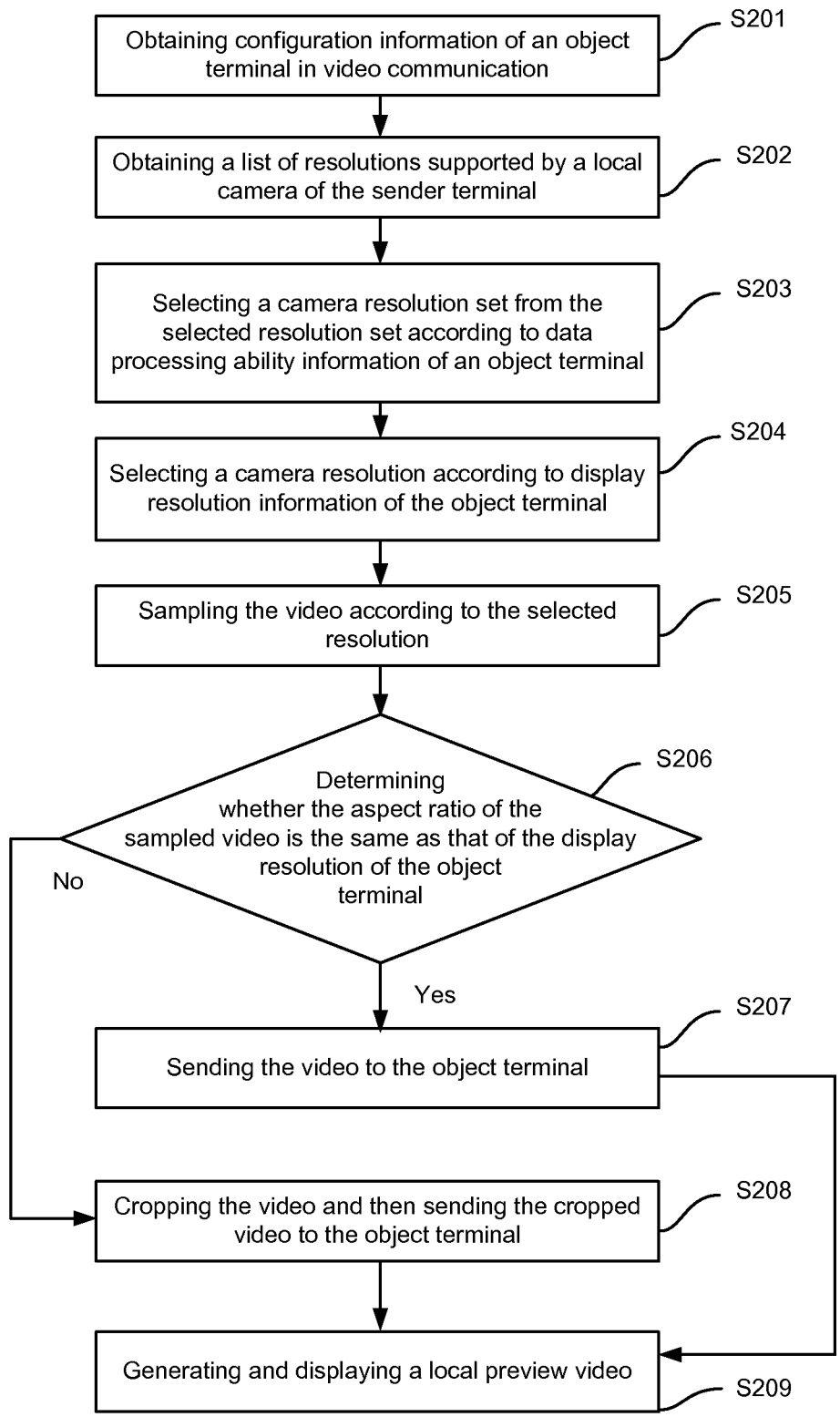
FIG. 2 is an example flowchart showing a video communication method according to the example embodiments of the present disclosure.

FIG. 2 is an example flowchart of a video communication method according to the example embodiments of the present disclosure. The method may be stored in a non-transitory storage medium in the memory 804 as a set of instruction, and may be implemented and executed by the processor 820 of the device 800. The method may include the following steps.

At step S201, the sender terminal obtains configuration information of a video communication object terminal.

According to the example embodiments of the present disclosure, a first user using a mobile terminal A (e.g., the sender terminal) may make video communication with a second user using a mobile terminal B (e.g., the object terminal or receiver terminal). The screen resolution of the mobile terminal A may be 1280×720, which has an aspect ratio of 16:9. The screen resolution of the mobile terminal B is 800×480, which has an aspect ratio of 5:3.

Before starting the video communication between the mobile terminal A and the mobile terminal B, the sender terminal may first obtain configuration information of the object terminal. For example, when the video communication is bilateral, the mobile terminal A and the mobile terminal B may first obtain configuration information of each other. Alternatively, the sender terminal A may perform step S201 after initiating the video communication, that is, the sender terminal A may obtain the configuration information of the object terminal B at any time and in real time, and adjust the resolution for sampling video in real time according to the configuration information.

At step S202, the sender terminal obtains a list of resolutions supported by a local camera of the sender terminal.

According to an example embodiment of the present disclosure, the resolutions obtained by the mobile terminal A and supported by the local camera thereof may be the list in table 1 as below.

TABLE 1

| Camera resolution | Resolution aspect ratio |
|---|---|
| 1920 × 1080 | 16:9 |
| 1280 × 768 | 5:3 |
| 1280 × 720 | 16:9 |
| 1024 × 768 | 4:3 |
| 960 × 600 | 16:10 |
| 800 × 600 | 4:3 |
| 800 × 480 | 5:3 |
| 640 × 480 | 4:3 |
| 320 × 240 | 4:3 |
| 200 × 200 | 1:1 |

At step S203, the sender terminal selects a camera resolution set according to data processing ability information of the object terminal, wherein the data processing ability information may be included in the configuration information of the object terminal.

The sender terminal A may select a set of corresponding resolutions according to the performance of the CPU of the object terminal B. For example, if the CPU of the object terminal B is a 1.5 GHz dual-core processor or higher, the sender terminal A may select a set of high resolutions as the resolutions for sampling a video. If the CPU of the object terminal B is a 1.5 GHz dual-core processor or lower but higher than 1 GHz single-core processor, the sender terminal A may select a set of middle resolutions as the resolutions for sampling the video. If the CPU of the object terminal B is a 1 GHz single-core processor or lower, the mobile terminal A may select a set of low resolutions as the resolutions for sampling the video. Alternatively, the resolution may also be classed into two or more sets according to the performance of the CPU of the object terminal B, the purpose of which is to make the resolution for transmitting the video comply with the process ability of the object terminal B so as to make the mobile terminal B be able to perform the video communication fluently.

In the embodiment of the present disclosure, the set of high resolutions may include 1920×1080, 1280×768 and 1280×720, the set of middle resolutions may include 1024× 768, 960×600, 800×600, 800×480 and 640×480, the set of low resolutions may include 320×240 and 200×200. Alternatively, the sender terminal A may adopt other definition of resolution sets to make the process ability of the object terminal B sufficient to process the video in corresponding sets, such as to class 1024×768 into the set of high resolutions, or class 640×480 into the set of low resolutions. It is understood that above contents should not be interpreted as limitation to classing principle.

Additionally, the mobile terminal A may determine the data processing ability and select corresponding set of resolution according to the performance of the CPU, the memory, and the graphic processing chip of the object terminal B, or the performance of the CPU, the memory, and the graphic processing chip of the sender terminal A, whichever is lower, to ensure that video displayed on the object terminal's screen is fluent and smooth.

Additionally, the sender terminal A may also take quality of the video into account when selecting the resolution of the camera. For example, the quality of the video may include factors such as fluency of stream, sharpness of images, truthfulness of color, and quality of sound of the video. The sender terminal A may give different factors different priority when determining the resolution. For example, the sender terminal A may assign the fluency of video the highest priority, the quality of the sound the second highest priority, the sharpness of the image the third priority, and the color the lowest priority in sampling the video. As a result, when the CPU capabilities of the sender terminal and object terminal, or a combination of these factors renders sending a video with the best sound, color, sharpness, and fluency impractical, the sender terminal A may reduce the quality of color, sharpness of image or quality of sound when sending the video in order to keep the fluency of the video stream.

At step S204, the sender terminal selects a camera resolution from the selected resolution set according to display resolution information of the object terminal. The display resolution information may be included in the configuration information of the object terminal.

After obtaining the set of resolutions in the step S203, the sender terminal A may select a resolution from the selected set of resolutions for its camera. The selected resolution may have a minimum difference on aspect ratio (e.g., length v. width) from that of the display resolution of the object terminal B for sampling the video. If the object terminal B uses a full screen for video communication, the display resolution information may be the resolution of the screen of the object terminal B. If the object terminal B uses a window for video communication, the display resolution information may be the resolution of the window for video communication.

Figure 3:
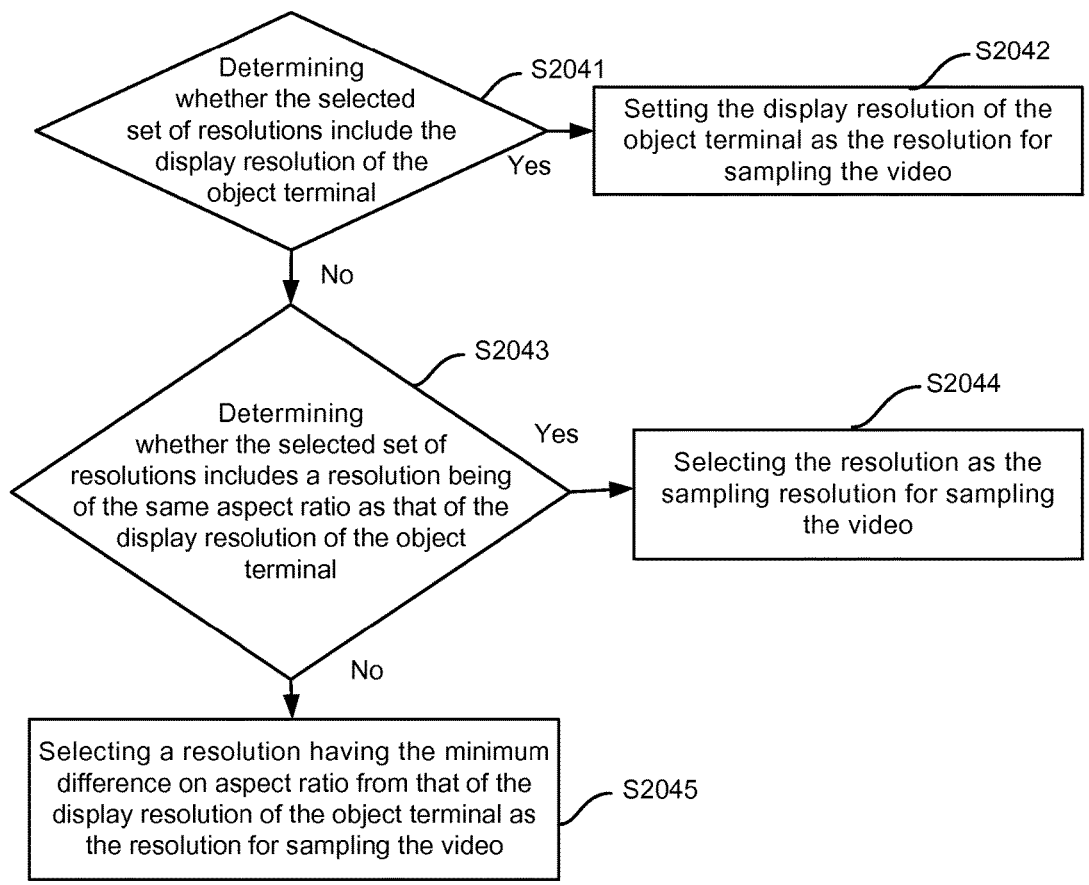
FIG. 3 is an example flowchart showing a procedure for selecting a resolution for a camera of a mobile terminal according to the example embodiments of the present disclosure.

FIG. 3 is an example flowchart of a step S204 according to an embodiment of the present disclosure. S204 may include the following steps.

At step S2041, the sender terminal determines whether the selected set of resolutions include the display resolution of the object terminal. If the display resolution of the object terminal is included, the sender terminal may proceed to execute step S2042 in which the display resolution of the object terminal is set as the resolution for sampling video. If the display resolution of the object terminal is not included, the sender terminal may proceed to execute step S2043.

For example, if the CPU of the object terminal is a 1.3 GHz dual-core processor, in step S203 the sender terminal A will obtain a set of middle resolution. Since the set of middle resolution includes the display resolution 800×480 of the object terminal B, then the sender terminal A may proceed to step S2042.

At step S2042, the sender terminal may set the display resolution of the object terminal as the resolution for sampling the video.

In the above example, the sender terminal A may set 800×480 as the resolution for sampling video.

At step S2043, the sender terminal determines whether the selected set of resolutions includes a resolution be of the same aspect ratio as that of the display resolution of the object terminal. If the selected set of resolutions includes a resolution having the same aspect ratio as the display resolution of the object terminal, the sender terminal may proceed to step S2044, in which the resolution that has the same aspect ratio as that of the display resolution of the object terminal is selected as the resolution for sampling the video. If no resolution has the same aspect ratio as the display resolution of the object terminal, the sender terminal may proceed to step S2045.

At step S2044, the sender terminal selects the resolution having the same aspect ratio as that of the display resolution of the object terminal as the resolution for sampling the video (i.e., the sampling resolution).

For example, if the display resolution of the object terminal B is 1280×768 with an aspect ratio of 5:3, and the sender terminal A determines that the aspect ratio of 800×480 in the set of middle resolution is 5:3, the sender terminal A may set 800×480 as the sampling resolution for sampling video.

At step S2045, the sender terminal selects a resolution having the minimum difference on aspect ratio from that of the display resolution of the object terminal as the resolution for sampling the video.

For example, if the display resolution of the object terminal B is 800×800, and the sender terminal A determines that no camera resolution in the set of middle resolution is identical to the display resolution of the object terminal B. At this time, the sender terminal A may select a resolution closest to the aspect ratio 1:1 of the resolution 800×800 in the set of middle resolution as the sampling resolution for sampling the video. In the set of middle resolution, the ratio closest to 1:1 is 4:3, which corresponds to resolutions 1024×768, 800×600 and 640×480. The sender terminal A may choose any one of the three resolutions as the sampling resolution, or choose the largest of them as the sampling resolution.

At step S205, the sender terminal samples (i.e., captures) the video according to the selected sampling resolution.

At step S206, the sender terminal determines whether the aspect ratio of the sampled video is the same as that of the display resolution of the object terminal.

For example, if the aspect ratio of the video sampled by the sender terminal A is the same as that of the display resolution of the object terminal B, the sender terminal A may proceed to step S207. If the aspect ratio of the video sampled by the sender terminal A is different from that of the display resolution of the object terminal B, the sender terminal A may proceed to step S208.

At step S207, the sender terminal sends the video to the object terminal.

At step S208, the sender terminal crops the video to the aspect ratio required by the object terminal and sends the cropped video to the object terminal.

For example, if the aspect ratio of the video sampled by the sender terminal A is different from that of the display resolution required by the object terminal B, the sender terminal A may crop the sampled video to the aspect ratio required by the display resolution of the object terminal B and then sends the cropped video to the object terminal B.

At step S209, the sender terminal generates and locally displays a preview video on its local screen. The resolution of the local preview video may be lower than the resolution for sampling video, the size of the local preview video may be smaller than the actual video displayed on the object terminal, and the aspect ratio of the local preview video may be the same as that of the resolution for sampling video.

For example, if the resolution of the video sent by the sender terminal A is 800×600, the resolution of the local preview video may be set to 320×240.

According to the methods provided by the example embodiments of the present disclosure, the resolution for sampling the video by local camera of the sender terminal may be automatically matched according to the configuration of the object terminal, so as to make the resolution of the video communication be matched with the processing ability of the object terminal and/or the sender terminal. This may prevent the situation that the object terminal cannot perform video communication from occurring, and to reduce the power consumption and data traffic. On the other side, it is no need for the object terminal to perform out-of-ratio stretching, compressing or cropping process on the received video so that the image of the video may not be distorted, thereby improving the user's experience.

The video communication methods provided by the example embodiments of the present disclosure are not limited to the mobile terminals. They are also suitable for other video terminal devices such as PC, notebook, multimedia TV and so on.

Figure 4:
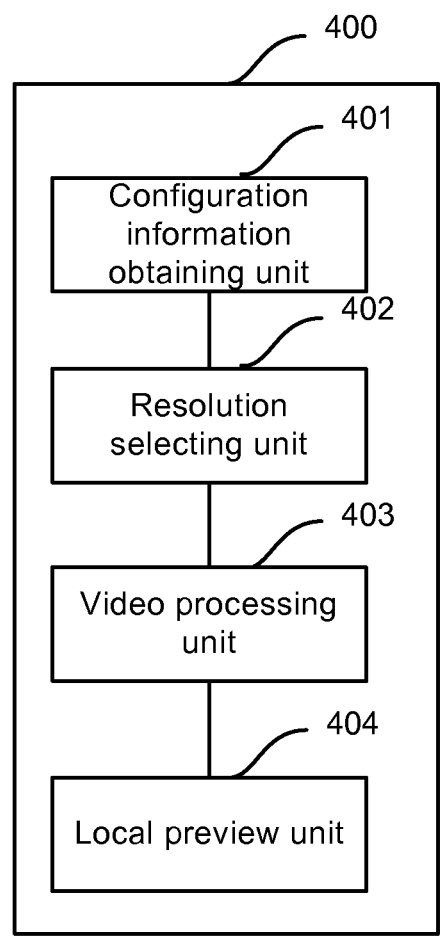
FIG. 4 is an example block diagram showing a video communication device according to the example embodiments of the present disclosure.

FIG. 4 is an example block diagram of a video communication device 400 according to example embodiments of the present disclosure. As shown in FIG. 4, the video communication device 400 may include a configuration information obtaining unit 401 configured to obtain the configuration information of an object terminal performing the video communication.

According to the example embodiments of the present disclosure, a first user using the video communication device 400 (i.e., the sender terminal) may wish to make a video communication with a second user using the mobile terminal B (i.e., the object terminal or receiver terminal).

Before starting the video communication between the video communication device 400 and the object terminal B, the configuration information obtaining unit 401 may first obtain configuration information of the object terminal B. The configuration information of the object terminal B may include display resolution information of the mobile terminal B and data processing ability information of the object terminal B, and/or other applicable information set forth in the above methods.

Figure 5:
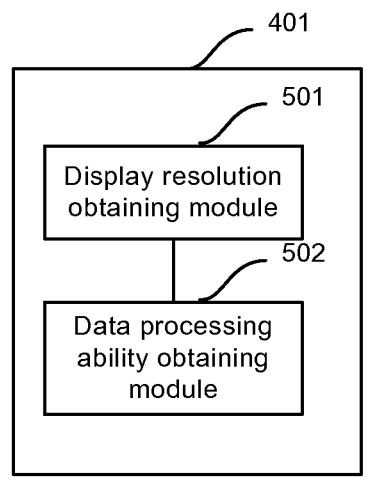
FIG. 5 is an example block diagram showing a configuration information obtaining unit according to the example embodiments of the present disclosure.

FIG. 5 is an example block diagram of a configuration information obtaining unit 401 according to the example embodiments of the present disclosure. As shown in FIG. 5, the configuration information obtaining unit 401 may include the follows.

A display resolution obtaining module 501 which is configured to obtain the display resolution of the object terminal performing the video communication.

For example, the display resolution obtaining module 501 may obtain a screen resolution of the object terminal B and a resolution of a video conversation window of the object terminal B.

The display resolution obtaining module 401 may also include a data processing ability obtaining module 502 which is configured to obtain data processing ability information of the object terminal performing the video communication.

The data processing ability obtaining module 502 may obtain the frequency of the CPU, the size of memory, and the model of the graphic processing chip of the mobile terminal B.

The video communication device 400 may also include a resolution selecting unit 402 configured to select a corresponding camera resolution as the sampling resolution for sampling the video according to the configuration information of the object terminal.

For example, the resolution selecting unit 402 may select a corresponding camera resolution, from the resolutions supported by its camera, as the sampling resolution for sampling the video according to the configuration information of the object terminal B.

If the configuration information is the display resolution information of the object terminal B, the resolution selecting unit 402 may match the resolution for sampling the video by a local camera with the display resolution of the object terminal B. The resolution selecting unit 402 may select a corresponding camera resolution, which is the same as the display resolution of the object terminal B, from the resolutions supported by its camera as the sampling resolution for sampling the video. If the local camera does not support the display resolution of the mobile terminal B, the resolution selecting unit 402 may make the sampling resolution for sampling the video by the local camera be the same as the display resolution of the mobile terminal B. If the local camera does not support the aspect ratio of the display resolution of the object terminal B, the resolution selecting unit 402 may select a resolution, which has the minimum difference on aspect ratio from that of the display resolution of the object terminal B, from the resolutions supported by the local camera as the sampling resolution for sampling video.

If the configuration information is the data processing ability information of the object terminal, the resolution selecting unit 402 may select corresponding camera resolution as the resolution for sampling video according to the data processing ability of the object terminal B. If the data processing ability of the object terminal is relatively good, the resolution selecting unit 402 may select a relatively high camera resolution as the sampling resolution for sampling the video. If the data processing ability of the mobile terminal B is relatively poor, the resolution selecting unit 402 may select a relatively low camera resolution as the sampling resolution for sampling the video.

The resolution selecting unit 402 may select the corresponding camera resolution as the sampling resolution for sampling the video according to both of the display resolution information and the data processing ability information of the object terminal B. Firstly, the resolution selecting unit 402 may select a set of appropriate camera resolutions according to the display resolution information of the object terminal B, and then select a camera resolution from the set of appropriate camera resolutions as the sampling resolution for sampling the video according to the data processing ability information of the object terminal B. Alternatively, the resolution selecting unit 402 also may select a set of appropriate camera resolutions according to the data processing ability information of the object terminal B, and then select a camera resolution from the set of appropriate camera resolutions as the sampling resolution for sampling the video according to the display resolution information of the object terminal B.

The video communication device 400 also includes a video processing unit 403 configured to sample the video according to the sampling resolution and to send the sampled video to the object terminal.

Figure 6:
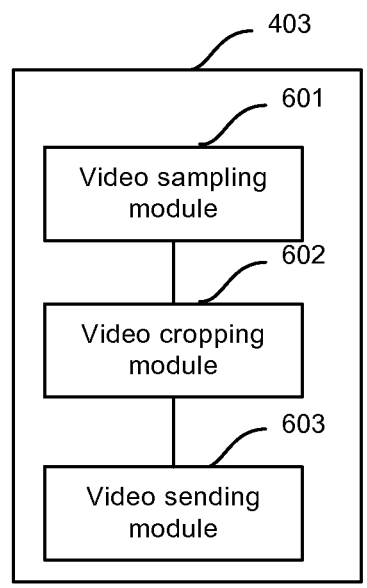
FIG. 6 is an example block diagram showing a video processing unit according to the example embodiments of the present disclosure.

FIG. 6 is an example block diagram of a video processing unit 403 according to the example embodiments of the present disclosure. As shown in FIG. 6, the video processing unit 403 may include a video sampling module 601 configured to sample the video according to the sampling resolution.

The video sampling module 601 may sampling the video according to the sampling resolution selected by the resolution selecting unit 402.

The video processing unit 403 may also include a video cropping module 602 configured to crop (i.e., cut) the sampled video to make the aspect ratio of the resolution of the cropped video be the same as that of the display resolution of the object terminal.

The video processing unit 403 may determine whether the resolution of the video sampled by the video sampling module 601 has the same aspect ratio as that of the display resolution of the object terminal B. If the resolution of the video sampled by the video sampling module 601 has the same aspect ratio as that of the display resolution of the object terminal B, the video cropping module 602 may not crop the video. If the resolution of the video sampled by the video sampling module 601 has a different aspect ratio from the display resolution of the object terminal B, the video cropping module 602 may crop the video sampled by the video sampling module 601 to make the aspect ratio of the resolution of the cut video be the same as that of the display resolution of the object terminal B.

The video processing unit 403 may also include a video sending module 603 configured to send the video to the object terminal.

If the aspect ratio of the video sampled by the video sampling module 601 is the same as that of the display resolution of the object terminal B, the video cropping module 602 may not cut the video, and the video sending module 603 may send the video sampled by the video sampling module 601 to the object terminal B directly. If the aspect ratio of the video sampled by the video sampling module 601 is different from that of the display resolution of the object terminal B, the video cropping module 602 may crop the sampled video to make the aspect ratio of the resolution of the cropped video be the same as that of the display resolution of the object terminal B, and then the video sending module 603 may send the cropped video to the object terminal B.

In the example embodiments of the present disclosure, the video communication device may further include a local preview unit 404 configured to generate and display a local preview video. The resolution of the local preview video may be lower than the resolution for sampling video, and the aspect ratio of the local preview video may be the same as that of the resolution for sampling video.

For example, if the resolution of the video sent by the video sending module 603 is 800×600, the resolution of the local preview video generated by the local preview unit 404 may be set to 320×240.

According to the video communication device provided by the example embodiments of the present disclosure, the resolution for sampling video by local camera may be automatically matched according to the configuration of the object terminal, so as to make the resolution of the video communication be matched with the processing ability of the object terminal, to prevent the situation that the object terminal cannot perform video communication from occurring, and to reduce the power consumption and data traffic. On the other side, it is no need for the object terminal to perform out-of-ratio stretching, compressing or cropping process on the received video so that the original ratio of the image is preserved and the user's experience is improved.

The video communication device provided by the example embodiments of the present disclosure is not merely limited to the mobile terminals. It may also be suitable for other video terminal devices such as PC, notebook, multimedia TV and so on.

The example embodiments as stated above further explain the objects, technical solutions and beneficial effects of the present disclosure. It should be understood that, above contents are only the specific embodiments of the present disclosure, and should not be used to limit the scope of protection of the present disclosure. Any modifications, equivalents, variations within the spirit and principle of the present disclosure should be considered as be within the scope of protection of the present disclosure.

What is claimed is:

1. A terminal device, comprising:
    a storage medium comprising a set of instructions for conducting video communication; and
    a processor in communication with the storage medium, wherein when executing the set of instructions, the processor is directed to:
        obtain configuration information of an object terminal in communication with the terminal device, wherein the configuration information comprises at least one display resolution supported by the object terminal;
        select a camera sampling resolution for a camera associated with the terminal device based on the configuration information of the object terminal, wherein the processor is further directed to:
            obtain a set of resolutions supported by the camera associated with the terminal device;
            determine whether an aspect ratio of a candidate resolution in the set of resolutions is the same as an aspect ratio of the at least one display resolution;
            based on a determination that the aspect ratio of the candidate resolution is the same as the aspect ratio of the at least one display resolution, select the candidate resolution as the camera sampling resolution; and
            based on a determination that none of the resolutions in the set of resolutions has the same aspect ratio as the at least one display resolution, select the candidate resolution from the set of resolutions having a minimum difference in aspect ratio from the at least one display resolution as the camera sampling resolution;
        directly obtain a video from the camera according to the camera sampling resolution; and
        send the video to the object terminal.

2. The terminal device of claim 1, wherein the at least one display resolution is a resolution of a target window on a screen of the object terminal, and
    the video is sent to the object terminal to display in the target window.

3. The terminal device of claim 1, wherein to directly obtain the video, the processor is directed to:
    sample the video based on the camera sampling resolution; and
    crop the video to the aspect ratio of the at least one display resolution.

4. The terminal device of claim 1, wherein the configuration information comprises data processing ability information of the object terminal, and the processor is direct to:
    select the camera sampling resolution for the camera based on the data processing ability information of the object terminal.

5. The terminal device of claim 4, wherein the data processing ability information of the object terminal comprises at least one of a frequency of the processor or a storage size of the storage medium of the object terminal.

6. A method for conducting video communication, comprising:
    obtaining, by a sender terminal, configuration information of an object terminal in communication with the sender terminal, wherein the configuration information comprises at least one display resolution supported by the object terminal;
    selecting, by the sender terminal, a camera sampling resolution for a camera associated with the sender terminal to sample a video based on the configuration information of the object terminal, wherein selecting the camera sampling resolution further comprises:
        obtaining a set of resolutions supported by the camera associated with the terminal device;
        determining whether an aspect ratio of a candidate resolution in the set of resolutions is the same as an aspect ratio of the at least one display resolution;
        based on a determination that the aspect ratio of the candidate resolution is the same as the aspect ratio of the at least one display resolution, selecting the candidate resolution as the camera sampling resolution; and
        based on a determination that none of the resolutions in the set of resolutions has the same aspect ratio as the at least one display resolution, selecting the candidate resolution having a minimum difference in aspect ratio from the at least one display resolution as the camera sampling resolution
    directly obtaining, by the sender terminal, a video from the camera according to the camera sampling resolution; and
    sending, by the sender terminal, the video to the object terminal.

7. The method of claim 6, wherein the at least one display resolution is a resolution of a target window on a screen of the object terminal, and
the video is sent to the object terminal to display in the target window.

8. The method of claim 6, wherein directly obtaining the video comprises:
sampling the video based on the camera sampling resolution; and
cropping the video to the aspect ratio of the at least one display resolution.

9. The method of claim 6, wherein the configuration information comprises data processing ability information of the object terminal, and selecting the camera sampling resolution for the camera based on the data processing ability information of the object terminal.

10. The method of claim 9, wherein the data processing ability information of the object terminal comprises at least one of a frequency of the processor or a storage size of the storage medium of the object terminal.

11. A processor-readable non-transitory storage medium, comprising a set of instructions for conducting video communication, wherein the set of instructions, when executed by a processor, directs the processor to perform actions of:
obtaining configuration information of an object terminal in communication with the sender terminal, wherein the configuration information comprises at least one display resolution supported by the object terminal;
selecting a camera sampling resolution for a camera associated with the sender terminal to sample a video based on the configuration information of the object terminal, wherein selecting the camera sampling resolution further comprises:
obtaining a set of resolutions supported by the camera associated with the terminal device;
determining whether an aspect ratio of a candidate resolution in the set of resolutions is the same as an aspect ratio of the at least one display resolution;
based on a determination that the aspect ratio of the candidate resolution is the same as the aspect ratio of the at least one display resolution, selecting the candidate resolution as the camera sampling resolution; and
based on a determination that none of the resolutions in the set of resolutions has the same aspect ratio as the at least one display resolution, selecting the candidate resolution having a minimum difference in aspect ratio from the at least one display resolution as the camera sampling resolution;
directly obtaining a video from the camera according to the sampling resolution; and
sending the video to the object terminal.

12. The storage medium of claim 11, wherein the at least one display resolution is a resolution of a target window on a screen of the object terminal, and
the video is sent to the object terminal to display in the target window.

13. The storage medium of claim 11, wherein directly obtaining the video comprises:
sampling the video based on the camera sampling resolution; and
cropping the video to the aspect ratio of the at least one display resolution.

14. The storage medium of claim 11, wherein the configuration information comprises data processing ability information of the object terminal, and
selecting the camera sampling resolution for the camera is based on the data processing ability information of the object terminal.

15. The storage medium of claim 14, wherein the data processing ability information of the object terminal comprises at least one of a frequency of the processor or a storage size of the storage medium of the object terminal.

* * * * *